United States Patent [19]
Hetzel et al.

[11] Patent Number: 5,552,921
[45] Date of Patent: Sep. 3, 1996

[54] METHOD OF COMMON TRANSFER OF DIGITAL, AUDIO AND CONTROL DATA ON A COMMON BUS LINE; BUS SYSTEM FOR IMPLEMENTING THE METHOD AND INTERFACE APPLICATION IN THE METHOD

[75] Inventors: Herbert Hetzel, Karlsruhe; Hans P. Mauderer, Malsch; Patrik Heck, Durmersheim, all of Germany

[73] Assignee: Becker Autoradiowerk GmbH, Karlsbad, Germany

[21] Appl. No.: 400,533

[22] Filed: Mar. 8, 1995

Related U.S. Application Data

[63] Continuation of Ser. No. 971,838, filed as PCT/EP92/01351 Jun. 15, 1992 published as WO93/00752 Jan. 7, 1993, abandoned.

[30] Foreign Application Priority Data

Jun. 21, 1991 [EP] European Pat. Off. ............... 91110247

[51] Int. Cl.[6] ............................ H04B 10/12; H04J 14/08
[52] U.S. Cl. ...................... 359/173; 359/137; 359/118; 359/158; 370/110.1; 370/60
[58] Field of Search .................................. 359/118, 124, 359/125, 123, 173; 370/60, 60.1, 110.1, 110.4, 135, 137, 158

[56] References Cited

U.S. PATENT DOCUMENTS

| 4,089,584 | 5/1978 | Polczynski | 359/115 |
|---|---|---|---|
| 4,422,180 | 12/1983 | Wendt | 359/173 |
| 4,450,554 | 5/1984 | Steensma et al. | 359/123 |
| 4,659,890 | 3/1987 | Hasegawa et al. | 359/173 |
| 4,739,183 | 4/1988 | Tokura et al. | 307/9 |
| 4,866,704 | 9/1989 | Bergman | 359/139 |
| 5,115,429 | 5/1992 | Hluchyj et al. | 370/84 |
| 5,257,259 | 10/1993 | Tsurumi | 170/60.1 |

FOREIGN PATENT DOCUMENTS

| 0176788 | 4/1986 | European Pat. Off. | H04L 11/16 |
|---|---|---|---|
| 0202602 | 11/1986 | European Pat. Off. | G08C 23/00 |
| 3923239 | 2/1991 | Germany | H04B 1/203 |

OTHER PUBLICATIONS

Fujitsu Scientific and Technical Journal, B. 18, Nr. 2, Jun. 1982, Kawasaki, JP pp. 141–157, Kuga et al. "Optical Loop Data Highway for Subway Power Control System".

*Primary Examiner*—Leo Boudreau
*Assistant Examiner*—Rafael Bacares
*Attorney, Agent, or Firm*—Sixbey, Friedman, Leedom & Ferguson, P. C.; Gerald J. Ferguson, Jr.; Eric J. Robinson

[57] ABSTRACT

A bus system for the transfer of audio and control data on a common bus line of fiber optic cables (LWL) in a system of users is compatible with sources and sinks of audio data (2,2a,2b) and/or control and monitoring data (8,8a,8b). Each user is connected to the bus system by a standardized interface (6,6a,6b) circuited together in series via fiber optic cables (LWL A, LWL B) preferably closed to form a ring by means of a further fiber optic cable (LWL C). This bus system is suitable for being operated with an internationally standardized transfer format. The bus system is impervious to noise, can be produced at low cost and is exceptionally powerful. This bus system is particularly suitable for use in vehicles.

15 Claims, 4 Drawing Sheets

METHOD OF COMMON TRANSFER OF DIGITAL, AUDIO AND CONTROL DATA ON A COMMON BUS LINE; BUS SYSTEM FOR IMPLEMENTING THE METHOD AND INTERFACE APPLICATION IN THE METHOD

This application is a continuation of Ser. No. 07/971,838, filed as PCT/EP92/01351 Jun. 15, 1992 published as WO93/00752, Jan. 7, 1993, now abandoned.

TECHNICAL FIELD OF THE INVENTION

The invention relates to a method of common transfer of digital audio and control data on a common bus line in a user system to which at least one digital audio source and at least one digital control data signal source belong; a bus system for implementing the method and an interface for application in the method.

BACKGROUND OF THE INVENTION

In many fields of engineering a local conglomeration of completely different kinds of electrical and electronic equipment is required to exchange information which thus requires networking in a sometimes complicated manner. For instance, in motor vehicles, sources of audio signals such as radio receivers, cassette recorders or CD players require, on the one hand, connecting together and, on the other, to audio sinks such as amplifier speaker combinations. It may prove useful to also incorporate audio equipment which formerly formed a separate system, such as car phones in such a system. In addition, there is a trend towards increasingly complex control and monitoring of vehicle functions. Of the innumerable possibilities in this respect, here merely monitoring the function of external lights on the vehicle or the inflation pressure or measuring and/or controlling the engine speed or the turbocharging pressure is cited.

For this purpose extensive wiring connections are necessary between the individual components. Even when, as intended, many items of equipment and functions are controlled and handled by a vehicle computer, the problem of the many wires and the length thereof remains. Also of disadvantage is the fact that many of the known components are unable to directly communicate with each other. For instance, to prompt the audio system to output a recorded text as a warning via the speakers, in the case of a reduction in tire inflation pressure, the expense involved until now was prohibitive. A great many other examples of networking vehicle components have already been stated which, however, have only been realized in part, such as a standardized transfer of audio data, on the one hand, or control data, on the other, each via a separate network of shielded wiring. Employing a bus system, although desirable, is hampered by major difficulties as regards the necessary bus arbitration and the resulting time losses. Since users of the most different kinds have to be connected to the common bus line which is required to handle a data thruput, to transfer two-channel digital audio data in addition to control and measurement data, for example, conflicting transfer requirements can hardly be avoided.

The object forming the basis of the invention is to achieve a universal system for the exchange of audio and control data between many and varied items of electrical and electronic equipment via a bus system which is reliable, cost-effective and exceptionally powerful.

This object—as far as the method is concerned—is achieved by the features of claim 1 of the invention. The features of a bus system suitable for implementing the method according to the invention as well as a corresponding hardware interface are disclosed by claims 5 and 8.

The achievement according to the invention offers a wealth of advantages. By all items of equipment to be connected to each other being circuited in series by a single bus line, wiring can be saved and the circuiting simplified. Using fiber optic cables for data transfer achieves, on the one hand, complete freedom from noise whilst, on the other, greatly reducing weight and saving material which in vehicle applications involving the use of very many electrical and electronic components is particularly significant. Digital transfer places only minor requirements on the quality of the optical transfer medium and the electrooptical converters used and thus the costs thereof are slight. Since the transfer distances involved are short, low-cost plastic fiber optic cables can be employed. Due to the interfaces permitting standardization allowing the same type of interface module to be used, the electronics can also be realized at low cost. This eliminates complicated bus arbitration since each user has its own transmit channel and control data can be transferred monodirectional on each section of the fiber optic cable. This channel dedication permits optimum use to be made of available user channel capacity, since no capacity whatsoever must be reserved for bus arbitration. Apart from this, channel dedication permits exceptionally straight-forward user software coupling.

In the preferred embodiment of the bus system the series circuit of the users is a closed ring according to claim 10. Receiving control data can then be acknowledged according to claim 3 by a specific bit in the signal sequence being modified or removed. Since the modified signal sequence is returned to the transmitting interface via the closed ring bus system, this interface is directly informed whether its assigned control data channel is again available.

In accordance with claim 3 the AES3-1985 standard is used as the transfer format. This standard was created in coordination with the European Broadcasting Union as an internationally standardized protocol for digital audio transfer which is already used in conjunction with CD players and makes a single data channel available to the user which can be employed to transfer control data, for example. The fact that only a single data channel is available shows that this format is not actually intended for use in a bus system. The bus system according to the invention suffices with a signal channel due to the time multiplexing on the bus line. Apart from this, there is no problem in operating the bus system according to the invention with its own standard; however, using an international protocol facilitates communication with users such as CD equipment, using this protocol.

The remaining subclaims relate to further advantageous embodiments of the invention.

The invention is not only suitable for application in automobiles but also in particular in aerospace vehicles due to the low weight of the data transfer circuitry. In addition, networking stationary video, audio, telephone and data processing systems is also possible by means of the bus system according to the invention to reduce the volume of the circuit connections formerly necessary.

BRIEF DESCRIPTION OF THE DRAWINGS

Further features and advantages of the invention result from the following description of several embodiments and with reference to the drawing in which.

DETAILED DESCRIPTION OF THE PREFERRED EMBODIMENTS

Figure 1:
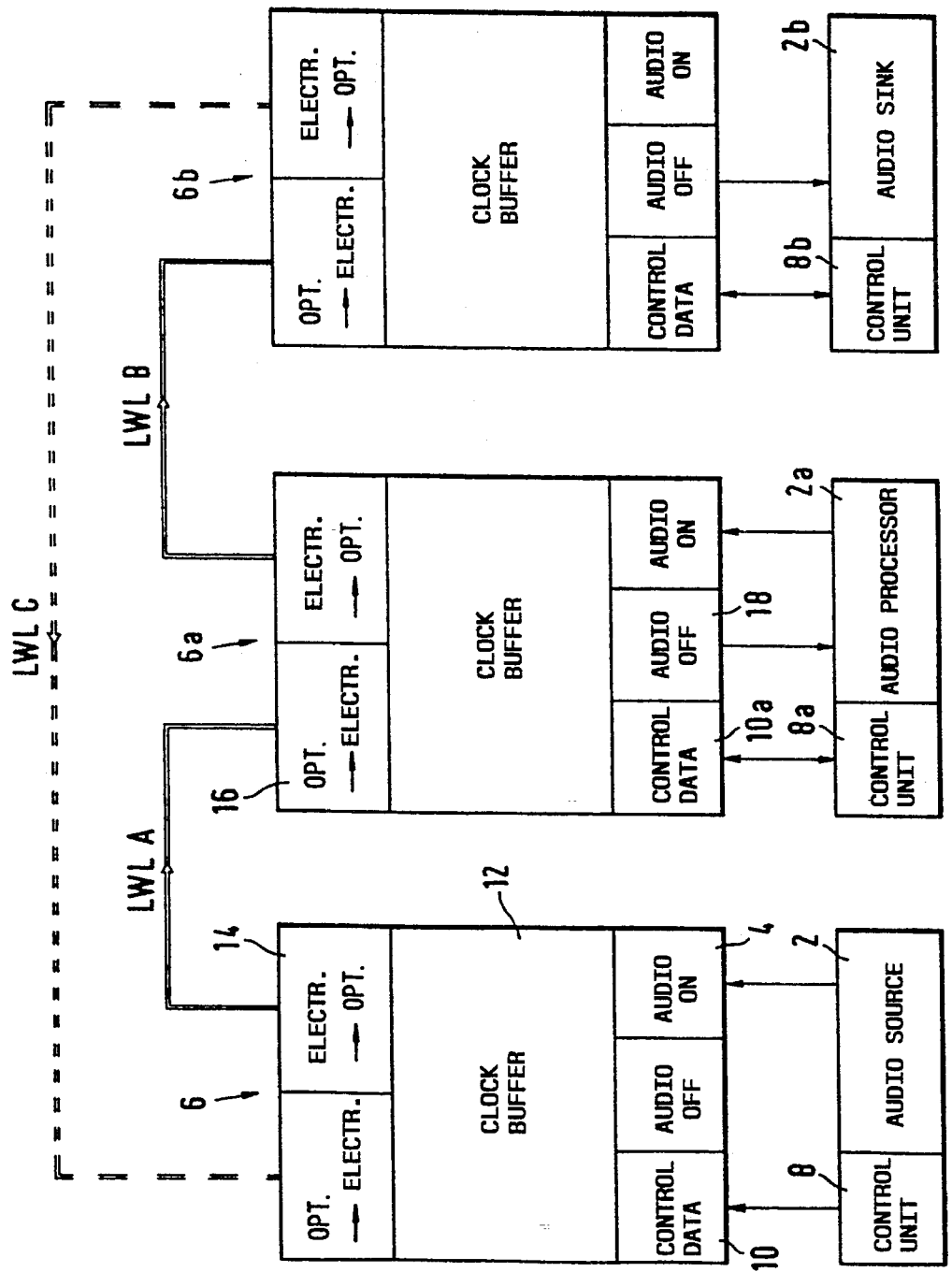
FIG. 1 is a schematic diagram showing a system of users employing the method of the invention, FIG. 2 serves to explain the data transfer formats used in the method.

In the embodiment shown in FIG. 1 an audio source 2, such as a radio receiver, for example, presents its audio signal to an input circuit 4 of an interface 6. The input circuit 4 for instance, can be one of the known circuits 12S, Sony bus or MSB-LSB-First having a variable format length. The audio source 2 is further connected to a control unit 8 which outputs certain control signals, for example, control signals which determine which of several loudspeakers is to be signalled. These control signals, wherein the control signals include at least one bit that is reserved for the control data, are applied to interface 6 via a suitable parallel or serial interface 10 of the latter where they are converted together with the audio data into a common serial data format which is described in more detail below and features a data channel for the control signals. Should no such control signals be available at interface 6, due to the radio receiver failing to have such options, for example, the bits representing the control signals are set to zero. The data clock is determined by the clock of the audio data stemming from the audio source 2, when it sends the data in a suitable data format or by means 12 comprising a clock source and data buffer belonging to the interface. The data clock frequency is 32.0, 44.1 or 48.0 kHz, for example, corresponding to a baud rate of 2.0, 2.8 and 3.0 Mbaud respectively.

The sequence of audio and control data in common is converted by an electrooptical converter 14 into a synchronous light signal which is applied to a fiber optic cable section LWL A. This embodiment is intended for a relatively compact system so that low-cost plastic fiber optic cables and converters of the simplest kind can be used. Fiber optic cables of plastic can also be circuited with very small radii of curvature which is of a great advantage in an automobile, for example. The fiber optic cable section LWL A ends in an optoelectrical converter 16 of a second interface 6a which has an identical configuration to that of the interface 6 and which connects an audio processor 2a. The latter may be, for example, a multi-channel bass/treble control. The audio data is made available to the audio processor 2a via a suitable output circuit 18 where the data is modified, as required, and returned to the interface 6a. In this embodiment the audio processor 2a also features a control unit 8a which is able to react to control data contained in the data sequence and output by a suitable interface 10a or which is able to output control data itself.

The same as in the first interface 6, here too the data, which may be modified where necessary, are then applied to a second fiber optic cable section LWL B for monodirectional entry into a third interface 6b, again having the same configuration as that of interface 6, by means of which the data activates an audio sink 2b such as, for instance, an amplifier/speaker combination via which the audio signals are to be reproduced acoustically. The audio sink 2b comprises a control unit 8b for receiving data from the control data channel.

All interfaces 6, 6a and 6b have an identical configuration to rationalize their production; however, it is not always the case that they are used in their entirety.

Another feasible arrangement would be that the control unit 8b belonging to the audio sink 2b has a control data output to prompt corrections of the bass/treble control, should, for instance a speaker failure occur. It is good practice not only in this case to connect the third interface 6b via a third fiber optic cable section LWL C to the first interface 6 as is indicated by the dashed line in FIG. 1. Such a ring arrangement of users is, in fact, a preferred embodiment of the invention and is described in more detail below.

Figure 2:
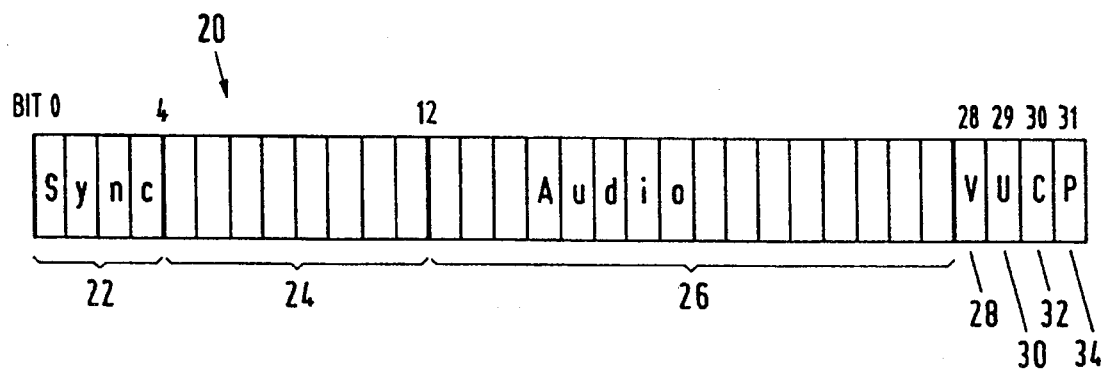

FIG. 2 shows the smallest unit 20 of the data format preferably used in view of the intended maximum-possible compatibility in accordance with the AES-EBU protocol for audio transfer in the consumer range and professional studio range AES3-1985 (ANSI S4.40-1985, Standards and Information Documents, Audio Engineering Society, Inc., New York 1985). This unit 20 is termed a subframe and contains 32 bits. A first group 22 of 4 bits in the unit 20 serves to synchronize and distinguish between the left-hand and right-hand stereo channel. A second group 24 of 8 bits following in time sequence is available for audio data which is, however, still hardly made use of currently. This is followed by a third group 26 of 16 bits for audio data which is already used. The termination of a subframe 20 is formed by a sequence of discrete bits 28, 30, 32 and 34 of which bit 30 is termed the user bit and can be utilized by the user arbitrarily without affecting audio transfer. As regards the significance of the bits 28, 32 and 34 reference is made to the cited AES-EBU protocol. Each stereo channel is assigned a subframe 20, two of which follow in sequence in each case to form a frame, 192 frames then forming what is termed a block.

Figure 3:
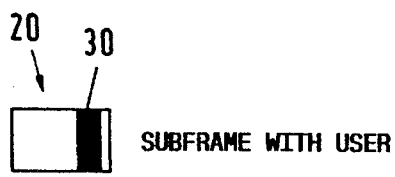
FIG. 3 illustrates the multiplexing step of the method.
Figure 3:
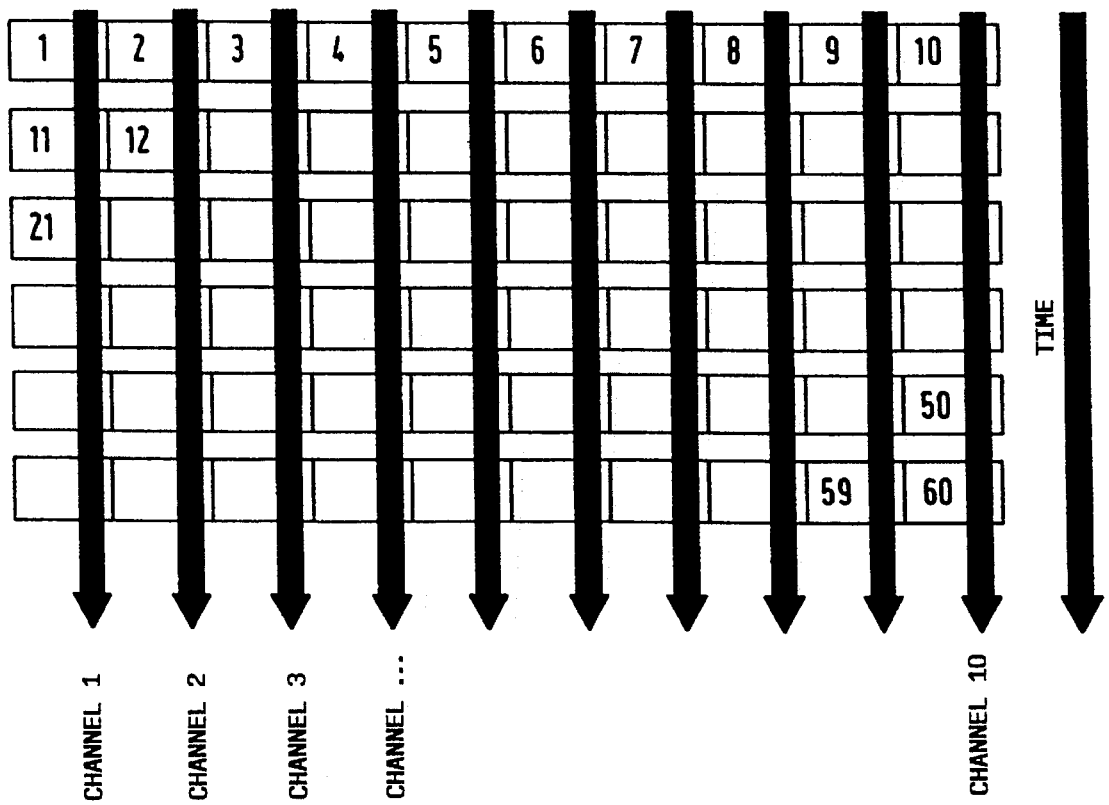

The user bit 30 causes a serial data channel to be opened which is subdivided into any number of subchannels by a time multiplex procedure. FIG. 3 shows, for example, the divisioning into 10 subchannels. Each 1st, 11th, 21st etc bit of the data sequence contained in the data channel opened by the user bit 30 is assigned as a subchannel to a channel 1, each 2nd, 22nd, 32nd etc bit to a channel 2, and so on. Each user transmits on a channel. For a total baud rate of 2 Mbaud a control data baud rate of 64 kbaud results for a 32 bit long subframe 20. In a preferred embodiment 8 subchannels are provided for each of which a transfer capacity of 8 kbaud thus remains, such a capacity being sufficient to transfer even complex information.

Figure 4:
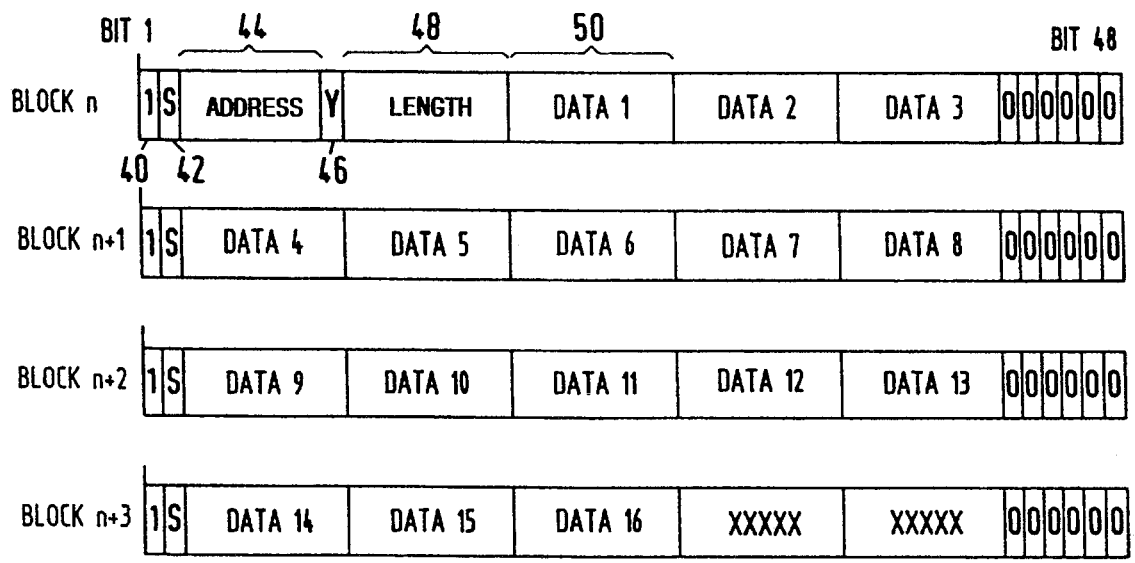
FIG. 4 shows a data sequence in a control data channel.

FIG. 4 shows a special data sequence in one of the 8 user channels of four blocks n, n+1, n+2 and n+3, each 48 bits long (384 subframes/8 subchannels). Each block bgeins with a bit 40 set to logical 1 to mark the start of the data sequence. This is followed by a start bit 42, this being set to logical 1 on commencement of the data message to be transferred and to logical 0 when the data message is continued with the next block. The start bit is followed by a 7 bit long address 44, each user being assigned a specific address. The address 44 is followed by a bit 46 which the receiver of a data sequence can change to acknowledge receipt or inform the sender whether a channel is again vacant or whether the message was rejected. Bit 46 is followed by a bit sequence 48 containing coded information as to the length of the subsequent actual data sequence. This data is transferred in groups 50, identified in FIG. 4 by Data1, Data2, etc.

Figure 5:
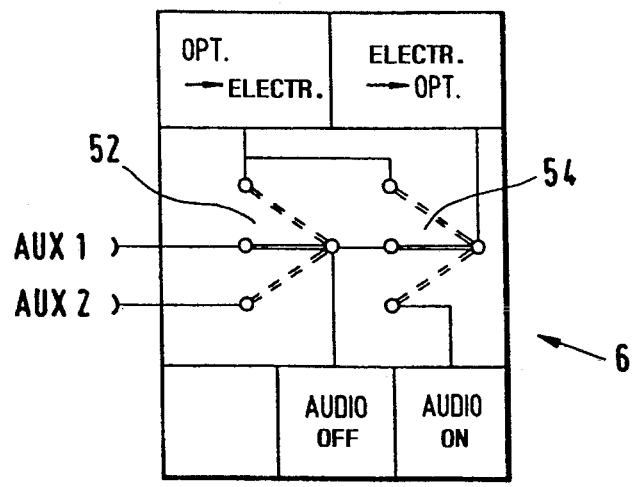
FIG. 5 is a schematic diagram showing how one of the interfaces is equipped for selecting the various audio sources, and FIG. 6 serves to explain the configuration and function of an interface between fiber optic cable sections and a system user.

FIG. 5 is a schematic diagram showing how two further audio sources Aux1 and Aux2 are coupled to the bus system via an interface 6. The configuration of interface 6 corresponds to that of the interfaces 6, 6a and 6b shown in FIG. 1. The selectors 52 and 54 which may also be implemented electronically permit the choice of signal feed from the audio sources Aux1 and Aux2. In the special case in which the selectors 52 and 54 are both in the UP position in FIG. 5 the audio signals of the bus system pass the interface 6 unchanged.

Figure 6:
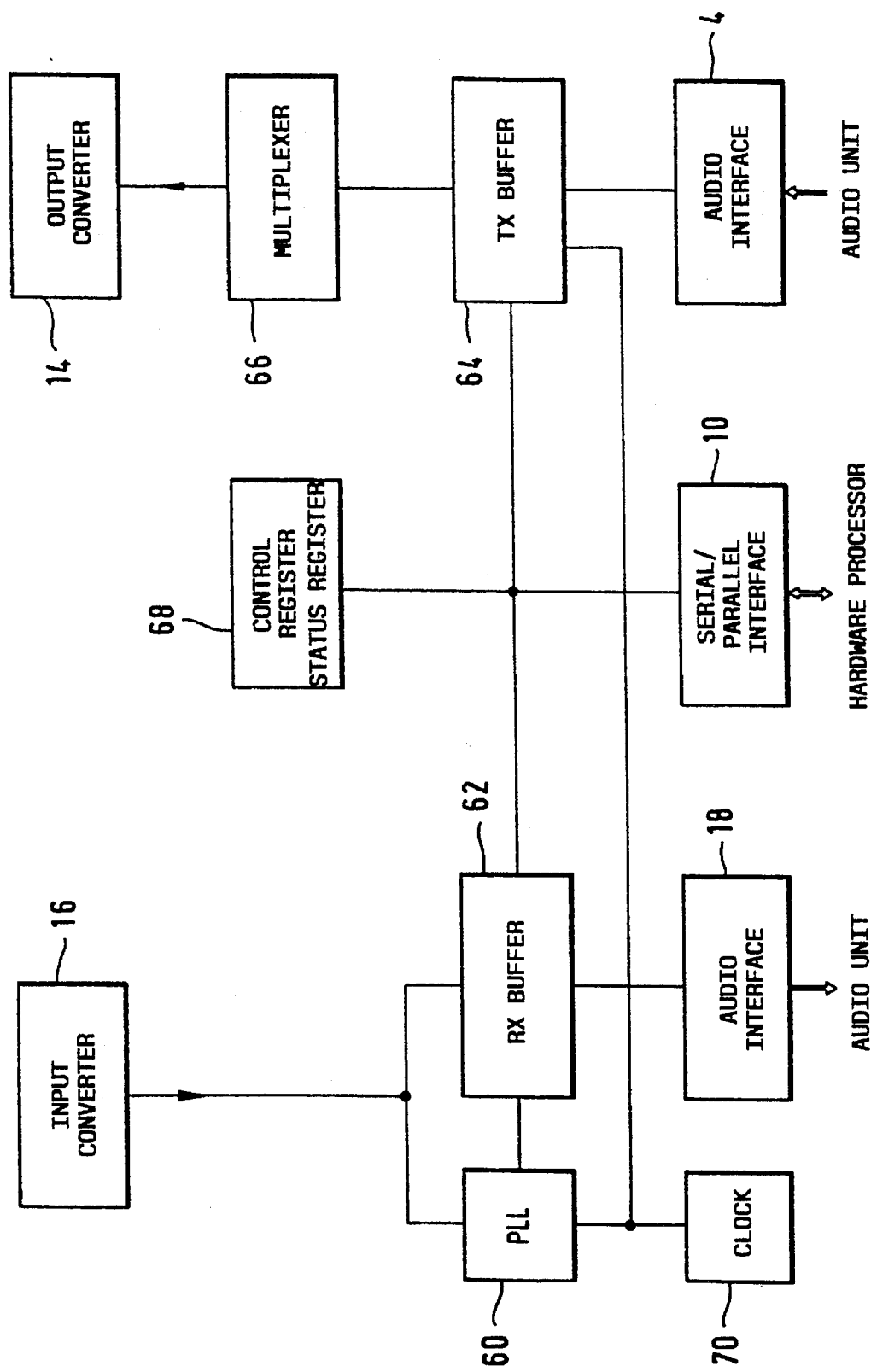

The salient parts of one of the interfaces 6, 6a or 6b shown in FIG. 1 are depicted in the block diagram of FIG. 6. Parts which have already been explained in conjunction with FIG. 1 have received the same reference numerals. All parts with the exception of the electrooptical convertors 14 and 16 are implemented in a single integrated circuit to save costs. The converters 14 and 16 are here considered as elements of the interface, but in actual implementation can be connected right from the start with the fiber optic cables and are not connected electrically to the remaining parts of the interface until the system is installed. A circuit 60 contains a phase locked loop PLL which tunes itself to the electrical signals coming from the one converter 16. Circuit 60 is also capable of determining when an address contained in the signals agrees with an address assigned to the corresponding interface. In addition, the data sequence is applied to the receiver buffer 62. The audio data is converted via an output circuit 18 into various formats of which the one matching a respective connected audio unit is transferred. Control data is applied to a microprocessor of the connected user and back again via an interface 10 also designed to handle several formats. The control data to be transmitted is applied via a transmit buffer 64 to a multiplexing means 66, the mentioned format being configured, on the one hand, and, on the other, the control data being read into the multiplex channel correct in time. Audio data arriving from the connected audio unit via an input circuit 4, or, audio data from the receiver buffer 62 are also incorporated in the format and the complete data sequence is applied to a converter 14 which converts the electrical signals back into optical signals. Data management is the job of a control and status register 68 connected to the receiver buffer 62, the transmit buffer 64 and the interface 10. When an address contained in the data fails to agree with the user address the data is passed on unchanged. Due to buffering a certain shift in time results, this being arranged, however, so that the data is resorted into its correct channel. The clock information is received by the transmit buffer 64 from a clock circuit 70 which receives the clock either from the PLL circuit 60 or from a separate clock generator. This clock generator need not be a component of the interface, however, since commercially available audio sources such as CD players generally contain such a clock generator, this being the reason why it is not indicated.

As evident from FIG. 1 a basic distinction is made among three different modes of operation as regards audio transfer. The mode of the interface 6 shown on the left in the Figure is an active mode in which the mentioned data format is originally generated, i.e. based either on the clock of the data stemming from the audio source 2 or on the clock of a separate clock generator. In this so-called master mode only one interface of a system is operative at any one time. The two other interfaces 6a and 6b generate no clock of their own, but adapt by their PLL circuit to the clock as specified. This mode of operation is termed slave mode. Interface 6a shown in the middle of the Figure has a special feature, it being able to receive and also modify audio data when required. In this case the mode is termed a slave/processor mode. The interface 6b on the right of the Figure behaves purely passive as regards the audio data by it merely passing the data on.

An essential feature of the invention is that data transfer via the fiber optic cables is in one direction only. Only one user operates in the master mode and thus dictates the clock. Together with the fact that each user employs its own transmit channel and a bus arbitration is not necessary it is possible to connect a large number of users to a single network without transfer conflict despite a high data thruput. Transmitting is possible on all control data channels at the same time, this being the reason why each control data channel has a mean data transfer rate which is available at all times. Compared to conventional bus systems of comparable performance the costs of realizing the system are exceptionally low. When the first and last user are reconnected together a closed ring results in which a message can circulate until its receiver accepts it. The sender of a message is able to determine whether its message has arrived at the receiver. To this end, bit 46 is used which as already mentioned in conjunction with FIG. 4 is altered or removed by the receiver of a message to acknowledge the receipt.

In one particular embodiment of the invention the audio data is rerouted already within the interface and directly retransmitted, namely when the connected user features no audio unit at all or merely executes control or monitoring functions. For instance, the system can be used with any of the many types of sensors employed in a vehicle. In one embodiment of the invention these sensors can be interrogated within the scope of a vehicle diagnosis for which a separate diagnosis subchannel is provided by means of a transparent bit which is not manipulated and passes through the chain of users without being changed.

We claim:

1. A method of common transfer of digital audio and control data on a common bus line in a user system which contains at least one digital audio source and at least one digital control data signal source, each user having an associated interface for connection to said bus line and said bus line being configured as a series circuit of alternating fiber optic cable sections and interfaces, each interface connecting two successive fiber optic cable sections and converting signals arriving from one fiber optic cable section into electrical signals, converting electrical signals into optical signals and feeding these optical signals into the other fiber optic cable section;

the method comprising the steps of:
transferring audio and control data in a format specifying a sequence of discrete groups of bits of equal length in which the audio data occupy a predetermined number of bits in each group and at least one bit is reserved for the control data; said sequence being clocked at a data clock frequency determined by the clock of said digital audio source;
forming at least one control data channel with said reserved bit;
assigning individual addresses to at least some of said users; and
causing each user having an assigned address to continuously interrogate said control data channels via the associated interface to respond to transferred control data when an address preceding said control data on said bus line agrees with the user address.

2. The method according to claim 1, wherein data transfer from each interface to a succeeding interface is monodirectional and said bus line forms a closed loop, each user modifying or removing a particular bit in a sequence of control data every time said user receives control data addressed to it and wherein each user transmitting control data monitors said control data as returned to it via said closed loop for changes in said returned control data.

3. The method according to claim 2, wherein said sequence of control data comprises coded information indicative of the length of said sequence of control data.

4. The method according to claim 1, wherein said format corresponds to standard AES3-1985 (AMSI S.4.40-1985) requiring each bit group to comprise 32 bits of which 24 bits are employed for the audio data, 1 bit for forming said control data channels and the remaining bits for checking and sync functions.

5. The method according to any one of the previous claims, wherein one of said users operates in a master mode as a source of audio data while all other users operate in a slave mode as potential audio data receivers.

6. The method according to claim 5, wherein said user operating in a master mode generates a master clock signal and said users operating in a slave mode comprise a phase-locked loop to derive a slave clock from said master clock.

7. The method according to claim 6, wherein at least one of said users operating in a slave mode processes received audio data.

8. A bus system for the transfer of digital audio and control data on a common bus line in a user system which contains at least one digital audio source each user having an associated interface for connection to said bus line and said bus line being configured as a closed loop series circuit of alternating fiber optic cable sections and interfaces, each interface connecting two successive fiber optic cable sections and converting signals arriving from one fiber optic cable section into electrical signals, converting electrical signals into optical signals and feeding these optical signals into the other fiber optic cable section;

said audio and control data being transferred in a format specifying a sequence of discrete groups of bits of equal length in which the audio data occupy a predetermined number of bits in each group and at least one bit is reserved for the control data;

said sequence being clocked at a clock frequency determined by the clock of said digital audio source;

each of said interfaces being of the same standardized type; and each interface having
an associated address,
an input and an output for connecting to respective fiber optic cable sections,
means for converting optical signals into electrical signals,
means for buffering received data,
means for converting electrical signals into optical signals, and
means for responding to transferred control data when said associated address corresponds to an address preceding said control data.

9. The bus-system according to claim 8, wherein said user system comprises at least two of the following users:
radio receivers, cassette recorders, CD players, amplifier/speaker combinations, sound processors, telephone components, measurement value sensors, actuators for implementing commands transferred via the fiber optic cable sections, means for data acquisition, data storage, data processing and data analysis, particularly in a vehicle.

10. The bus system according to claim 8, wherein said fiber optic cable sections are formed by plastic fiber optic cables.

11. An interface for employment in a bus system for the transfer of digital audio and control data on a common bus line in a user system which contains at least one digital audio source each user having an associated interface for connection to said bus line and said bus line being configured as a closed loop series circuit of alternating fiber optic cable sections and interfaces, each interface connecting two successive fiber optic cable section and converting signals arriving from one fiber optic cable section into electrical signals, converting electrical signals into optical signals and feeding these optical signals into the other fiber optic cable section;

said audio and control data being transferred in a format specifying a sequence of discrete groups of bits of equal length in which the audio data occupy a predetermined number of bits in each group and at least one bit is reserved for the control data, said sequence being clocked at a clock frequency determined by the clock of said digital audio source;

each of said interfaces being of the same standardized type; and each interface having
an input connectable to a fiber optic cable section,
an optoelectrical converter for converting received optical signals into electrical signals,
an output connectable to a fiber optic cable section,
an electrooptical converter for converting electrical signals into transmitted optical signals,
an input circuit for audio signals received from a user,
an output circuit for audio signals to be transmitted to a user,
an input/output circuit for receiving and transmitting control data from and to a user, and
means for buffering electrical signals.

12. The interface according to claim 11, comprising means to cause said interface to operate in one of the following modes:
a) a master mode in which audio data received from a user connected to said interface is fed to the fiber optic cable section connected to its output;
b) a slave mode in which audio data received from a fiber optic cable section connected to said input can be passed on unmodified to the fiber optic cable section connected to said output;
c) a slave/processor mode in which audio data received from a fiber optic cable section connected to said input can be modified by the user and fed with a time shift to the fiber optic cable section connected to said output.

13. The interface according to claim 12, comprising a clock generator which, depending on an operating mode of a user connected to said interface—master or slave—generates said clock in an autonomous manner or derives said clock by means of a phase-locked loop from signals arriving from a user operating in the master mode.

14. The interface according to claim 11, comprising a plurality of inputs for users operating as audio sources and switching means for selecting among said inputs.

15. The interface according to claim 11, wherein said input/output circuit can process differing standards for control data from and to a user.

\* \* \* \* \*